US010247929B2

(12) United States Patent
Ohno et al.

(10) Patent No.: US 10,247,929 B2
(45) Date of Patent: Apr. 2, 2019

(54) LIGHT IRRADIATION DEVICE AND ADDITIVE LAYER MANUFACTURING APPARATUS

(71) Applicant: KABUSHIKI KAISHA TOSHIBA, Minato-ku (JP)

(72) Inventors: Hiroshi Ohno, Yokohama (JP); Takahiro Terada, Yokohama (JP); Masayuki Tanaka, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 269 days.

(21) Appl. No.: 15/124,251

(22) PCT Filed: Sep. 12, 2014

(86) PCT No.: PCT/JP2014/074275
§ 371 (c)(1),
(2) Date: Sep. 7, 2016

(87) PCT Pub. No.: WO2015/141031
PCT Pub. Date: Sep. 24, 2015

(65) Prior Publication Data
US 2017/0017067 A1    Jan. 19, 2017

(30) Foreign Application Priority Data

Mar. 18, 2014   (JP) ................................. 2014-055654

(51) Int. Cl.
*B29C 67/00* (2017.01)
*G02B 19/00* (2006.01)
(Continued)

(52) U.S. Cl.
CPC ........ *G02B 19/0028* (2013.01); *B29C 64/153* (2017.08); *B29C 64/20* (2017.08);
(Continued)

(58) Field of Classification Search
CPC ..... B29C 64/153; B29C 64/209; B29C 64/20; B29C 64/255; B29C 64/264;
(Continued)

(56) References Cited

U.S. PATENT DOCUMENTS

2006/0165546 A1* 7/2006 Yamada ................ B22F 3/1055
419/6
2014/0104686 A1   4/2014 Yuasa et al.
2017/0304947 A1* 10/2017 Shibazaki ............. B33Y 10/00

FOREIGN PATENT DOCUMENTS

CN      1814391 A    8/2006
JP      3-72065 A    3/1991
(Continued)

OTHER PUBLICATIONS

International Search Report dated Dec. 9, 2014 in PCT/JP2014/074275 filed Sep. 12, 2014.
(Continued)

*Primary Examiner* — Joseph S Del Sole
*Assistant Examiner* — Lawrence D. Hohenbrink, Jr.
(74) *Attorney, Agent, or Firm* — Oblon, McClelland, Maier & Neustadt, L.L.P.

(57) ABSTRACT

A light irradiation device according to an embodiment is for an additive layer manufacturing apparatus. The light irradiation device includes a light condensing unit and a function unit. The light condensing unit condenses a plurality of first light beams. At least a part of the function unit is positioned at a location among the plurality of first light beams or at a location surrounded by the plurality of first light beams.

14 Claims, 13 Drawing Sheets

(51) Int. Cl.
  *B33Y 30/00* (2015.01)
  *C23C 24/10* (2006.01)
  *B29C 64/153* (2017.01)
  *B29C 64/20* (2017.01)
  B29C 64/393 (2017.01)
  B29C 64/209 (2017.01)
  B29C 64/321 (2017.01)
  B33Y 50/02 (2015.01)
  B29C 64/255 (2017.01)
  B29C 64/264 (2017.01)
  B29C 64/268 (2017.01)
  B22F 3/105 (2006.01)
  B29K 105/00 (2006.01)

(52) U.S. Cl.
  CPC .............. *B33Y 30/00* (2014.12); *C23C 24/10* (2013.01); *G02B 19/0047* (2013.01); *B22F 3/1055* (2013.01); *B22F 2003/1056* (2013.01); *B29C 64/209* (2017.08); *B29C 64/255* (2017.08); *B29C 64/264* (2017.08); *B29C 64/268* (2017.08); *B29C 64/321* (2017.08); *B29C 64/393* (2017.08); *B29K 2105/251* (2013.01); *B33Y 50/02* (2014.12); *Y02P 10/295* (2015.11)

(58) Field of Classification Search
  CPC ... B29C 64/268; B29C 64/321; B29C 64/393; B33Y 30/00; B33Y 50/02; G02B 19/0028; G02B 19/0047; B22F 3/1055; B22F 2003/1056; Y02P 10/295
  USPC .................. 425/174.4, 375, 78; 264/308, 497
  See application file for complete search history.

(56) References Cited

FOREIGN PATENT DOCUMENTS

| | | |
|---|---|---|
| JP | 7-150366 A | 6/1995 |
| JP | 2006-200030 A | 8/2006 |
| JP | 2012-6028 A | 1/2012 |
| WO | 2012/176429 A1 | 12/2012 |

OTHER PUBLICATIONS

Japanese Office Action dated Nov. 4, 2015 in Japanese Application No. 2014-055654 filed Mar. 18, 2014 (with English translation).

\* cited by examiner

LIGHT IRRADIATION DEVICE AND ADDITIVE LAYER MANUFACTURING APPARATUS

CROSS-REFERENCE TO RELATED APPLICATIONS

This application is national stage application of International Application No. PCT/JP2014/074275, filed Sep. 12, 2014, which designates the United States, incorporated herein by reference, and which claims the benefit of priority from Japanese Patent Application No. 2014-055654, filed Mar. 18, 2014, the entire contents of which are incorporated herein by reference.

FIELD

Embodiments described herein relate generally to a light irradiation device and an additive layer manufacturing apparatus.

BACKGROUND

Conventionally, as a light irradiation device used in an additive layer manufacturing apparatus, a device configured to irradiate jetted-out powdery material with a light beam and cause the material to melt has been known.

The light irradiation device for an additive layer manufacturing apparatus needs to be structured such that a function unit does not block off the light beam. Thus, in the conventional structure, the layout of the function unit has been greatly restricted. Consequently, in this type of light irradiation device, it is meaningful if a structure that can improve the degree of freedom in the layout of the function unit.

DETAILED DESCRIPTION

According to an embodiment, a light irradiation device is for an additive layer manufacturing apparatus. The light irradiation device comprises a light condensing unit and a function unit. The light condensing unit condenses a plurality of first light beams. At least a part of the function unit is positioned at a location among the plurality of first light beams or at a location surrounded by the plurality of first light beams. The light condensing unit is a third lens. A part of the function unit is positioned at a location on a center side of the third lens among the plurality of first light beams.

With reference to the accompanying drawings, the following describes exemplary embodiments in detail. In a plurality of embodiments described above, the same components are included. Accordingly, in the following description, the same components are denoted by common reference signs and the redundant explanations thereof are omitted.

First Embodiment

Figure 1:
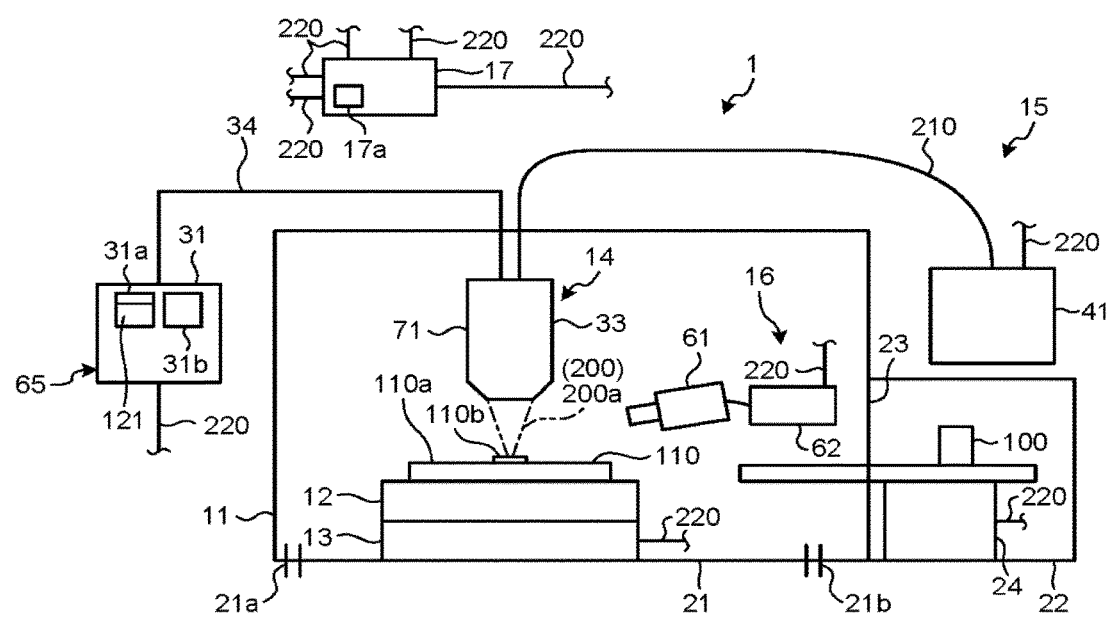
FIG. 1 is a schematic diagram of one example of an additive layer manufacturing apparatus according to a first embodiment.

As illustrated in FIG. 1, an additive layer manufacturing apparatus 1 includes a treatment tank 11, a stage 12, a moving device 13, a nozzle device 14, an optical device 15, a measuring device 16, a control device 17, and others.

The additive layer manufacturing apparatus 1 molds a laminate molded article 100 of a certain shape, by stacking material 121 fed by the nozzle device 14 in layers onto a target object 110 placed on the stage 12.

The target object 110 is an object to which the material 121 is fed by the nozzle device 14, and includes a base 110a and layers 110b. On the upper face of the base 110a, a plurality of layers 110b are layer-stacked. The material 121 is powdery metal material, resin material, and others. In molding, one or more materials 121 can be used.

In the treatment tank 11, a main chamber 21 and an auxiliary chamber 22 are provided. The auxiliary chamber 22 is provided being contiguous to the main chamber 21. Between the main chamber 21 and the auxiliary chamber 22, a door 23 is provided. When the door 23 is opened, the main chamber 21 and the auxiliary chamber 22 communicate with each other and, when the door 23 is closed, the main chamber 21 is to be airtight.

In the main chamber 21, an air supply port 21a and an exhaust port 21b are provided. By the operation of an air supply device (not depicted), an inert gas such as nitrogen and argon is supplied into the main chamber 21 via the air supply port 21a. By the operation of an exhaust device (not depicted), the gas inside the main chamber 21 is discharged from the main chamber 21 via the exhaust port 21b.

Furthermore, in the main chamber 21, a transfer device (not depicted) is provided. Extending from the main chamber 21 to the auxiliary chamber 22, a conveying device 24 is further provided. The transfer device passes the laminate molded article 100 that has been processed in the main chamber 21 to the conveying device 24. The conveying device 24 conveys the laminate molded article 100 that has been passed from the transfer device into the auxiliary chamber 22. That is, in the auxiliary chamber 22, the laminate molded article 100 that has been processed in the main chamber 21 is accommodated. After the laminate molded article 100 is accommodated in the auxiliary chamber 22, the door 23 is closed and the auxiliary chamber 22 and the main chamber 21 are isolated.

In the main chamber 21, provided are the stage 12, the moving device 13, a part of the nozzle device 14, the measuring device 16, and others.

The stage 12 supports the target object 110. The moving device 13 can move the stage 12 in three axial directions orthogonal to one another.

The nozzle device 14 feeds the material 121 to the target object 110 positioned on the stage 12. Furthermore, a nozzle 33 of the nozzle device 14 irradiates the target object 110 positioned on the stage 12 with a laser beam 200. The nozzle device 14 can feed a plurality of materials 121 in parallel and can selectively feed one of the materials 121. The nozzle 33 emits the laser beam 200 in parallel with the feeding of the material 121.

The nozzle device 14 includes a feeding device 31, the nozzle 33, a feeding pipe 34, and others. The material is fed to the nozzle 33 from the feeding device 31 via the feeding pipe 34.

The feeding device 31 includes a tank 31a and a feeding unit 31b. In the tank 31a, the material 121 is accommodated. The feeding unit 31b feeds the material 121 of the tank 31a in a certain amount. The feeding device 31 feeds a carrier gas (gas) that contains the powdery material 121. The carrier gas is an inert gas such as nitrogen and argon, for example.

As illustrated in FIG. 1, the optical device 15 includes a light source 41 and a cable 210. The light source 41 includes an oscillation element (not depicted), and by the oscillation of the oscillation element, emits the laser beam 200. The light source 41 can alter the power density of the laser beam it emits.

The light source 41 is connected to the nozzle 33 via the cable 210. The laser beam 200 emitted from the light source 41 is led to the nozzle 33. The nozzle 33 irradiates the material 121 jetted toward the target object 110 and the target object 110 with the laser beam 200.

The measuring device 16 measures the shape of the solidified layer 110b and the shape of the laminate molded article 100 that has been molded. The measuring device 16 transmits the information on the measured shape to the control device 17. The measuring device 16 includes a camera 61 and an image processing device 62, for example. The image processing device 62 performs image processing based on the information measured with the camera 61. The measuring device 16 measures the shapes of the layer 110b and the laminate molded article 100 by an interference method, a light section method, and others.

The control device 17 is electrically connected to the moving device 13, the conveying device 24, the feeding device 31, the light source 41, and the image processing device 62 via signal lines 220.

The control device 17 moves, by controlling the moving device 13, the stage 12 in three axial directions. The control device 17 conveys, by controlling the conveying device 24, the laminate molded article 100 that has been molded into the auxiliary chamber 22. The control device 17 adjusts, by controlling the feeding device 31, the presence and the feeding amount of the material 121. The control device 17 adjusts, by controlling the light source 41, the power density of the laser beam 200 emitted from the light source 41. Furthermore, the control device 17 controls the movement of the nozzle 33.

The control device 17 includes a storage 17a. In the storage 17a, stored are data indicative of the ratio of the materials 121, data indicative of shapes (reference shapes) of the laminate molded article 100 to be molded, and others.

The control device 17 can have a function of selectively feeding a plurality of different materials 121 from the nozzle 33 and adjusting (altering) the ratio of the materials 121. For example, the control device 17 controls, based on the data indicative of the ratio of each material 121 stored in the storage 17a, the feeding device 31 and others such that the layer 110b of the materials 121 is formed at the relevant ratio. By this function, a gradient material (a functionally gradient material) for which the ratio of a plurality of materials 121 varies (gradually decreases or gradually increases) depending on the location (place) of the laminate molded article 100 can be molded. Specifically, when forming the layers 110b, the control device 17 controls the feeding device 31 such that the ratio of the materials 121 reaches the ratio that is set (stored) corresponding to each location of three-dimensional coordinates of the laminate molded article 100, for example. This allows the laminate molded article 100 to be molded as a gradient material (functionally gradient material) for which the ratio of the materials 121 varies in any of three-dimensional directions. The amount of variation (rate of variation) of the ratio of the materials 121 in a unit length can also be set variously.

The control device 17 includes a function of determining the shape of the material 121. For example, the control device 17 determines, by comparing the shape of the layer 110b or the laminate molded article 100 acquired by the measuring device 16 and the reference shape stored in the storage 17a, whether a region that is not a certain shape has been formed.

Furthermore, the control device 17 includes a function of trimming the material 121 into a certain shape by eliminating an unnecessary region that is the region determined not to be the certain shape by the determination of the shape of the material 121. For example, when the material 121 is scattered and adheres to a region different from a certain shape, the control device 17 first controls the light source 41 such that the laser beam 200 reaches the power density capable of evaporating the material 121. Then, the control device 17 irradiates the relevant region with the laser beam 200 and evaporates the material 121.

Figure 2:
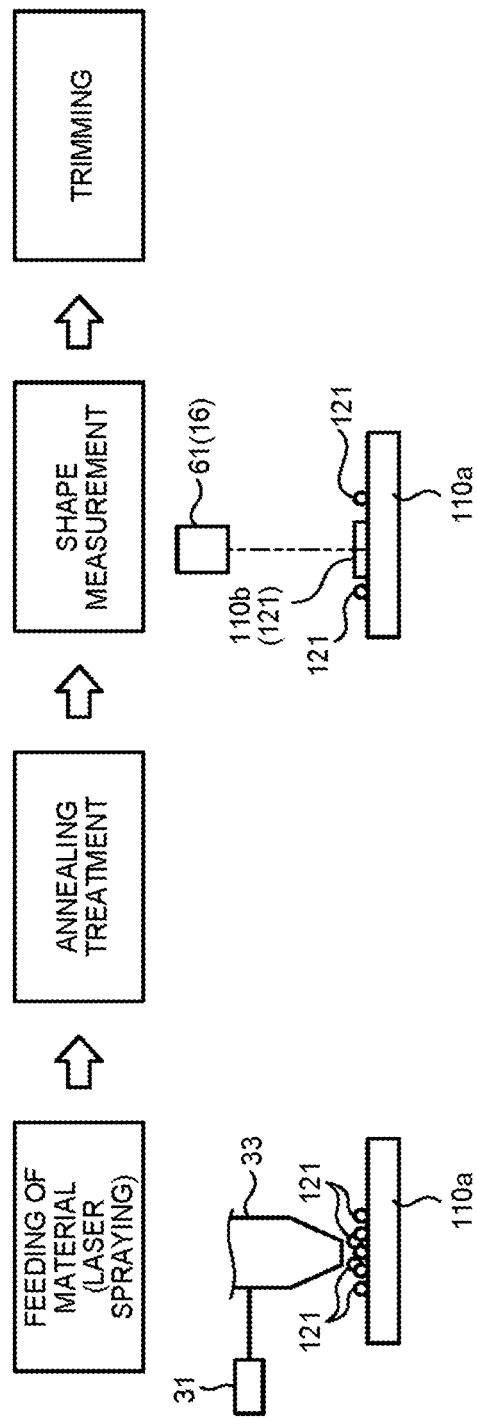
FIG. 2 is an explanatory diagram illustrating one example of a manufacturing process of a laminate molded article performed by the additive layer manufacturing apparatus in the first embodiment.

Next, with reference to FIG. 2, a manufacturing method of the laminate molded article 100 performed by the additive layer manufacturing apparatus 1 will be described. As illustrated in FIG. 2, the feeding of the material 121 and the irradiation of the laser beam 200 are first performed. The control device 17 controls the feeding device 31 and others such that the material 121 is fed to a certain range from the nozzle 33, and controls the light source 41 such that the fed material 121 is melted by the laser beam 200. Accordingly, as illustrated in FIG. 2, in a range forming the layer 110b on the base 110a, the melted material 121 of only a certain amount is fed. The material 121 deforms, when jetted onto the base 110a and the layer 110b, into an aggregation of the material 121 in a form of a layer or a thin film. Alternatively, by being cooled by a carrier gas that carries the material 121 or being cooled by heat transfer to an aggregation of the material 121, the material 121 is layer-stacked in particulate and forms an aggregation of particulates.

Next, an annealing treatment is performed. While the annealing treatment may be performed by using an annealing device (not depicted) outside the additive layer manufacturing apparatus 1, it may be performed in the additive layer manufacturing apparatus 1. In the latter case, the control device 17 controls the light source 41 such that the aggregation of the material 121 on the base 110a is irradiated with the laser beam 200. Accordingly, the aggregation of the material 121 is re-melted and forms the layer 110b.

Then, shape measurement is performed. The control device 17 controls the measuring device 16 so as to measure the material 121 that is on the base 110a and on which the annealing treatment has been performed. The control device 17 compares the shape of the layer 110b or the laminate molded article 100 acquired by the measuring device 16 and the reference shape stored in the storage 17a.

Subsequently, trimming is performed. While the trimming may be performed by using a trimming device (not depicted) outside the additive layer manufacturing apparatus 1, it may be performed in the additive layer manufacturing apparatus 1. In the latter case, by the shape measurement and the comparison to the reference shape, when it is found that the material 121 on the base 110a has adhered to a location different from a certain shape, for example, the control device 17 controls the light source 41 such that the unnecessary material 121 is evaporated. Meanwhile, by the shape measurement and the comparison to the reference shape, when it is found that the layer 110b was in the certain shape, the control device 17 does not perform the trimming.

Upon finishing the forming of the above-described layer 110b, the additive layer manufacturing apparatus 1 forms, on the layer 110b, a new layer 110b. The additive layer manufacturing apparatus 1 molds, by repeatedly stacking the layers 110b, the laminate molded article 100.

As illustrated in FIG. 1, the nozzle 33 includes a housing 71. The housing 71 is structured in a long tubular shape in the up-and-down direction. At the lower end portion of the housing 71, an opening 71a (see FIG. 7) is provided. The nozzle 33 is one example of a light irradiation device.

Figure 3:
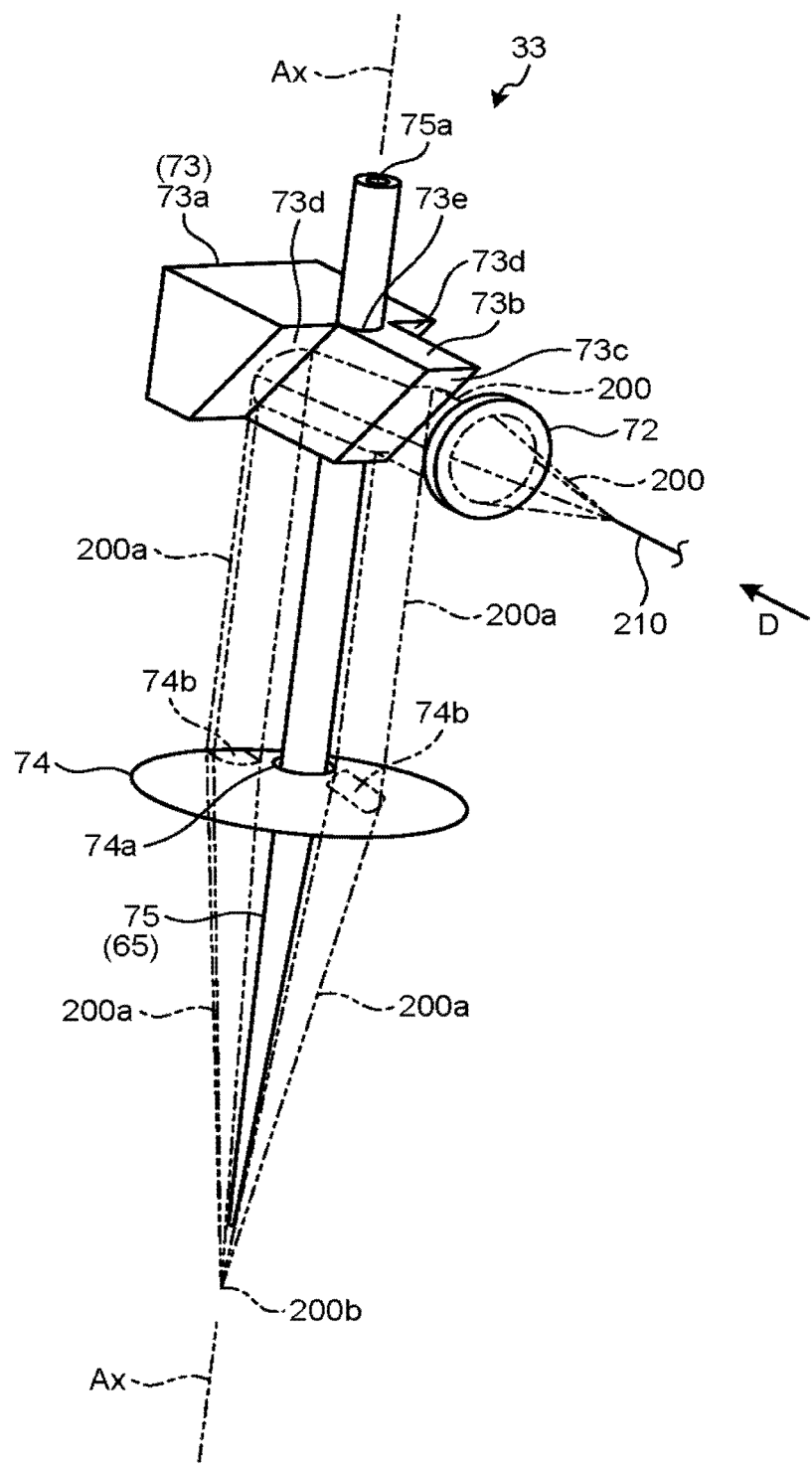
FIG. 3 is a perspective view illustrating a schematic configuration of the inside of one example of a light irradiation device in the first embodiment.
Figure 4:
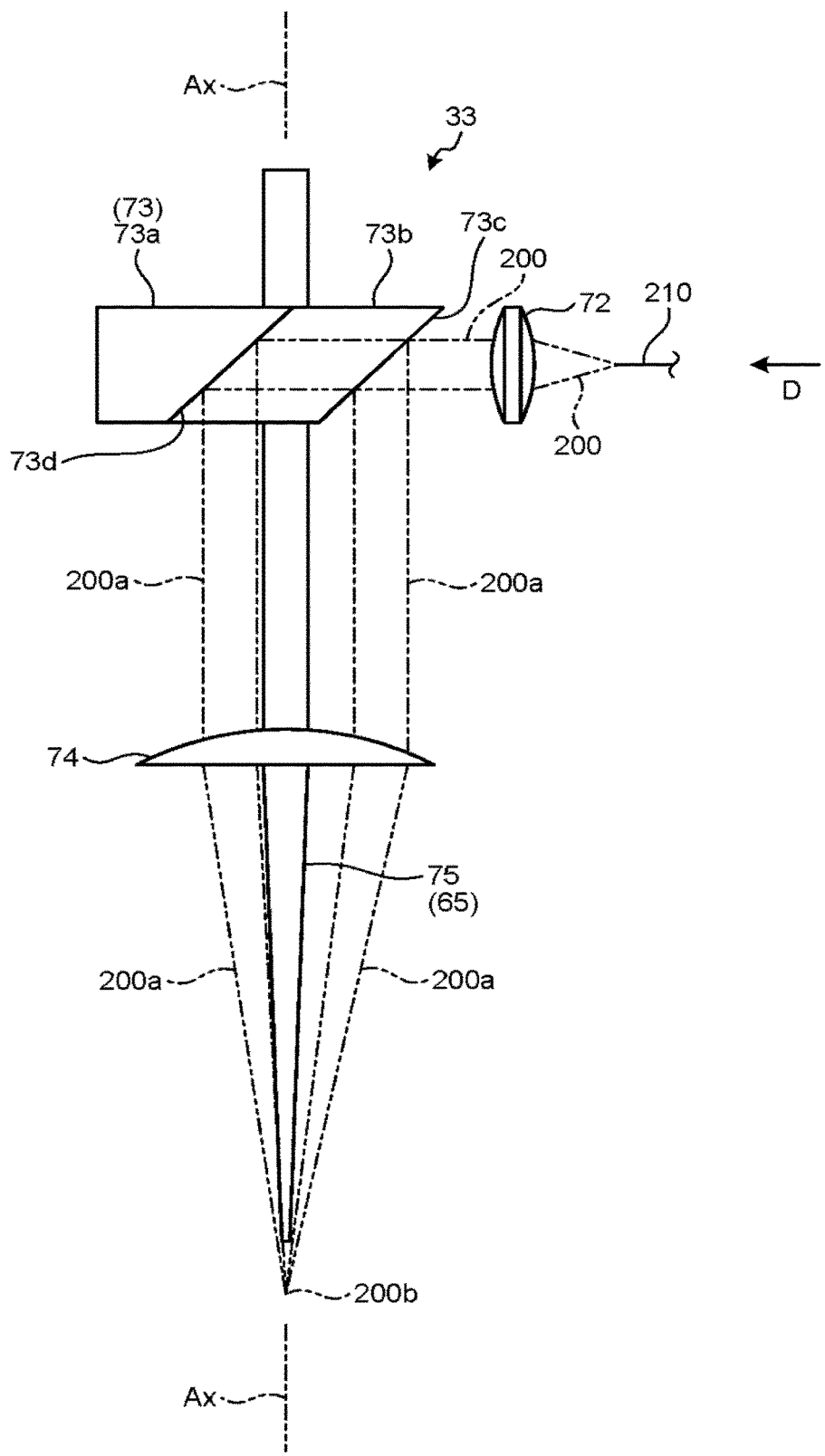
FIG. 4 is a side view illustrating the schematic configuration of the inside of the one example of the light irradiation device in the first embodiment.

FIG. 3 illustrates a perspective view of the nozzle 33 and FIG. 4 illustrates a side view of the nozzle 33. As illustrated in FIGS. 3 and 4, the nozzle 33 includes a lens 72, a mirror 73, a lens 74, and a pipe 75. The lens 72, the mirror 73, the lens 74, and the pipe 75 are housed inside the housing 71 (see FIG. 1), and are supported on the housing 71. The lens 72, the mirror 73, and the lens 74 compose an optical system that irradiates the target object 110 with the laser beam 200 (laser beams 200a). The pipe 75 composes, with the feeding device 31 and the feeding pipe 34, a material feeding unit 65 that feeds the material 121.

The lens 72 is positioned at an upper portion of the housing 71 in a position in which the optical axis thereof lies along the direction substantially orthogonal to the up-and-down direction (longitudinal direction) of the housing 71. Into the lens 72, the laser beam 200 that has been emitted and diffused from the cable 210 enters. The lens 72 makes (converts) the incoming laser beam 200 into a parallel beam and emits it. The laser beam 200 emitted from the lens 72 is incident on the mirror 73. The laser beam 200 that is incident on the mirror 73 is one example of a second light beam.

Figure 5:
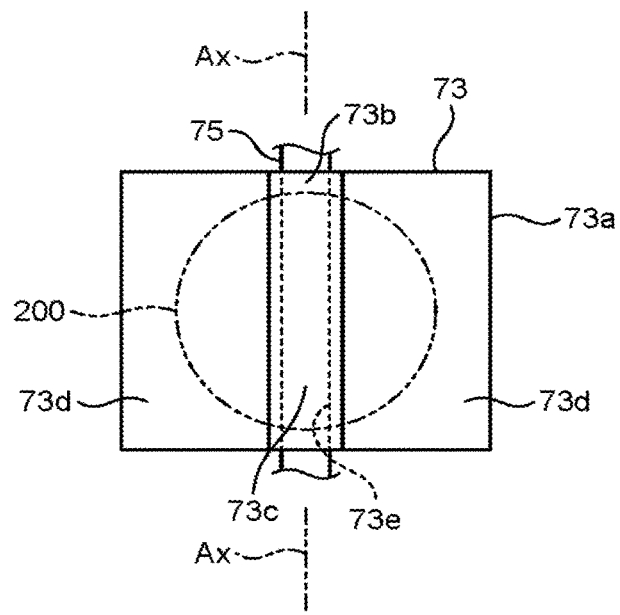
FIG. 5 is a side view of one example of a branching unit in the first embodiment.

The mirror 73 is opposite to (facing) the lens 72. The mirror 73 has a plurality of reflecting faces 73c and 73d. Furthermore, as illustrated in FIGS. 3 to 5, the mirror 73 has a base portion 73a (first portion) and an extended portion 73b (second portion). The extended portion 73b extends toward the lens 72 from a lens 72 side portion of the base portion 73a. On the distal end portion of the extended portion 73b (end portion opposite to the lens 72), the reflecting face 73c is provided. On portions on the lens 72 side of the base portion 73a, two (a plurality of) reflecting faces 73d are provided. Furthermore, on the mirror 73, an opening 73e is provided. The opening 73e is a through-hole, for example. The opening 73e runs through the mirror 73 in the up-and-down direction of the housing 71. In the opening 73e, at least a part of the pipe 75 is inserted. The opening 73e may be a cutout.

As illustrated in FIG. 4, the reflecting faces 73c and 73d are each inclined with respect to the optical axis of the laser beam 200 emitted from the lens 72, and reflect a portion of the laser beam 200 toward below the housing 71. Note that, in FIG. 4, only one of the two reflecting faces 73d is illustrated. However, the other also reflects in the same manner. The inclinations of the respective reflecting faces 73c and 73d with respect to the optical axis of the laser beam 200 are substantially the same. As can be found from FIG. 4, the reflecting faces 73d are positioned at locations farther away from the lens 72 (far side, left side in FIG. 4) than the reflecting face 73c. In other words, the reflecting face 73c is positioned at a location closer to the lens 72 (near side, right side in FIG. 4) than the reflecting faces 73d. That is, when viewing the pipe 75 with a first direction D as a line-of-sight direction (see FIGS. 3 and 4, a direction toward the reflecting face 73c from the lens 72), the reflecting face 73c is positioned rearward of the pipe 75 (a side close to the lens 72 is defined as rearward). Furthermore, when viewing the pipe 75 with the first direction D as a line-of-sight direction, the reflecting faces 73d are positioned forward than the reflecting face 73c (a side far from the lens 72 is defined as forward).

As illustrated in FIG. 5, the two reflecting faces 73d are positioned being spaced apart from each other, in a direction substantially orthogonal to the up-and-down direction of the housing 71 and in a direction (left-and-right direction in FIG. 5) substantially orthogonal to the optical axis of the laser beam 200 emitted from the lens 72. The extended portion 73b is positioned between the two reflecting faces 73d and, when viewing the pipe 75 with the first direction D as a line-of-sight direction, the reflecting face 73c is positioned between the two reflecting faces 73d. That is, when viewing the pipe 75 with the first direction D as a line-of-sight direction, the reflecting face 73c is positioned at a location overlapping with the pipe 75, and the reflecting faces 73d are positioned at locations deviating from the pipe 75. When viewing the pipe 75 with the first direction D as a line-of-sight direction, the pipe 75 is structured to be hidden completely behind the reflecting face 73c. Accordingly, the laser beam 200 emitted from the lens 72 always reaches any of the reflecting face 73c or 73d and is reflected. That is, a whole light beam of the laser beam 200 is totally reflected and, because there is no light beam deviating from the reflecting faces 73c and 73d, it is efficient.

As in the foregoing, in the first embodiment, due to a plurality of (three) reflecting faces 73c and 73d of the mirror 73 dispersedly arranged in a circumferential direction around the pipe 75, a plurality of (three) laser beams 200a are obtained from a single laser beam 200. Because each of the laser beams 200a is obtained by branching the laser beam 200 into a plurality of laser beams 200a, the laser beam 200a can be said to be a part of the laser beam 200. The laser beams 200a are dispersedly arranged in the circumferential direction around the pipe 75, and each advance along substantially the longitudinal direction (axial direction, central axis Ax) of the pipe 75. The laser beams 200a advance toward the lens 74 in a state of being away from the central axis Ax of the housing 71. That is, the laser beams 200a do not overlap, at least between the mirror 73 and the lens 74, with the central axis Ax. The laser beams 200a emitted from the mirror 73 are incident on the lens 74 in a state of being away from one another. The mirror 73 is one example of a branching unit. The reflecting face 73c is one example of a first reflecting face and the reflecting face 73d is one example of a second reflecting face. The laser beam 200a is one example of a first light beam.

Figure 6:
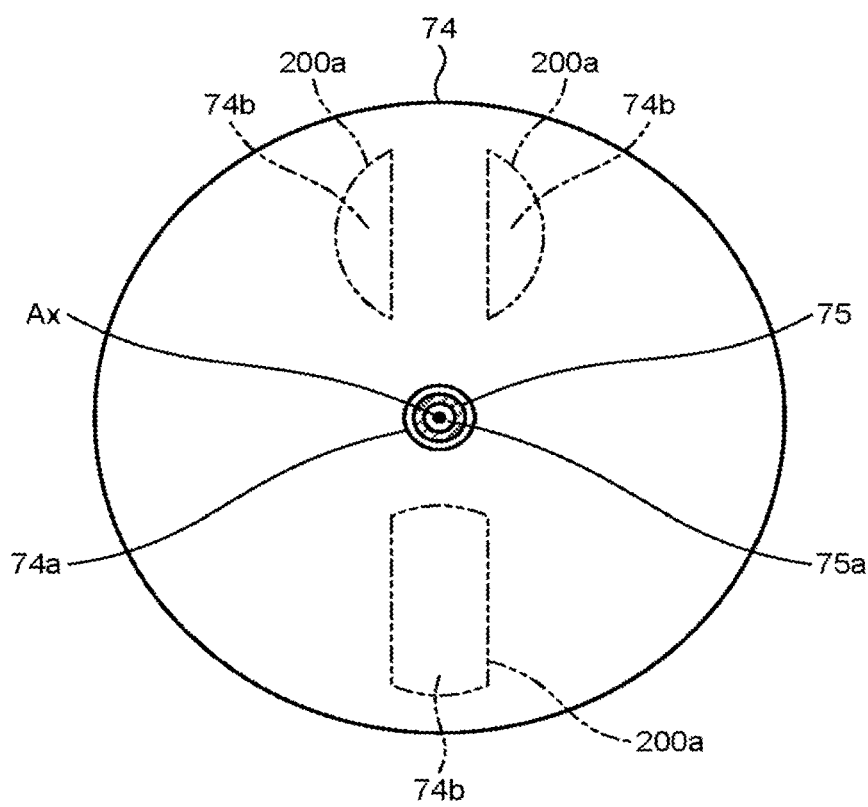
FIG. 6 is a front view of one example of a light condensing unit in the first embodiment.
Figure 8:
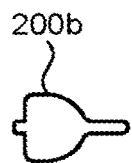
FIG. 8 is a schematic diagram of a light condensing region of laser beams that the one example of the light irradiation device in the first embodiment irradiated.

The lens 74 is positioned below the mirror 73, and is opposite to the mirror 73 in the up-and-down direction of the housing 71. The optical axis of the lens 74 substantially coincides with the central axis Ax of the housing 71. As illustrated in FIG. 6, into the lens 74, a plurality of laser beams 200a enter. The laser beams 200a pass through portions that are away from the central portion (optical axis) of the lens 74. That is, the laser beams 200a pass through the lens 74 in a state of being away from one another. The lens 74 condenses the laser beams 200a. By having the central portions of the respective laser beams 200a positioned at the same distance to one another from the optical axis of the lens 74, the condensing of the laser beams 200a by the lens 74 is performed further favorably. This is because a light condensing region 200b (light condensing spot) tends to get smaller as the symmetry with respect to the optical axis of the lens 74 is better. The lens 74 emits the respective laser beams 200a downward from the opening 71a of the housing 71, and condenses those laser beams 200a below the housing 71. As is apparent from FIGS. 3 and 4, by such a configuration, the laser beams 200a are condensed to the light condensing region 200b (light condensing position) while avoiding the pipe 75. The light condensing region 200b is positioned outside the end portion in the axial direction of the pipe 75 along the axial direction of the pipe 75. The shape of the light condensing region 200b is to be non-circular as illustrated in FIG. 8 as one example. The lens 74 is one example of a light condensing unit and a third lens.

Furthermore, as illustrated in FIG. 6, on the lens 74, an opening 74a is provided. The opening 74a is provided at a location on the center side of the lens 74 among the three (a plurality of) laser beams 200a. Specifically, the opening 74a is provided at the central portion of the lens 74. The opening 74a is provided at a location of the lens 74 deviating from regions 74b through which the laser beams 200a pass. The opening 74a is a through-hole, as one example. The opening 74a runs through the lens 74 along the optical axis of the lens 74. The opening 74a accommodates a part of the pipe 75. The opening 74a may be a cutout. The opening 74a is one example of a second opening.

As illustrated in FIGS. 3 and 4, the pipe 75 extends along the up-and-down direction of the housing 71. In the pipe 75, its pathway 75a overlaps with the central axis Ax of the housing 71. The pipe 75 is inserted into the opening 73e of the mirror 73 and into the opening 74a of the lens 74. The pipe 75 extends between an upper location of the mirror 73 and a lower location of the lens 74. The pipe 75, at least a part thereof, is positioned at a location surrounded by a plurality of laser beams 200a. Specifically, the pipe 75, at least a portion lower than the mirror 73, is surrounded by the laser beams 200a. That is, a plurality of laser beams 200a are arranged around at least a portion of the pipe 75 lower than the mirror 73. The laser beams 200a are condensed while avoiding the pipe 75. The pipe 75 is one example of a function unit.

Figure 7:
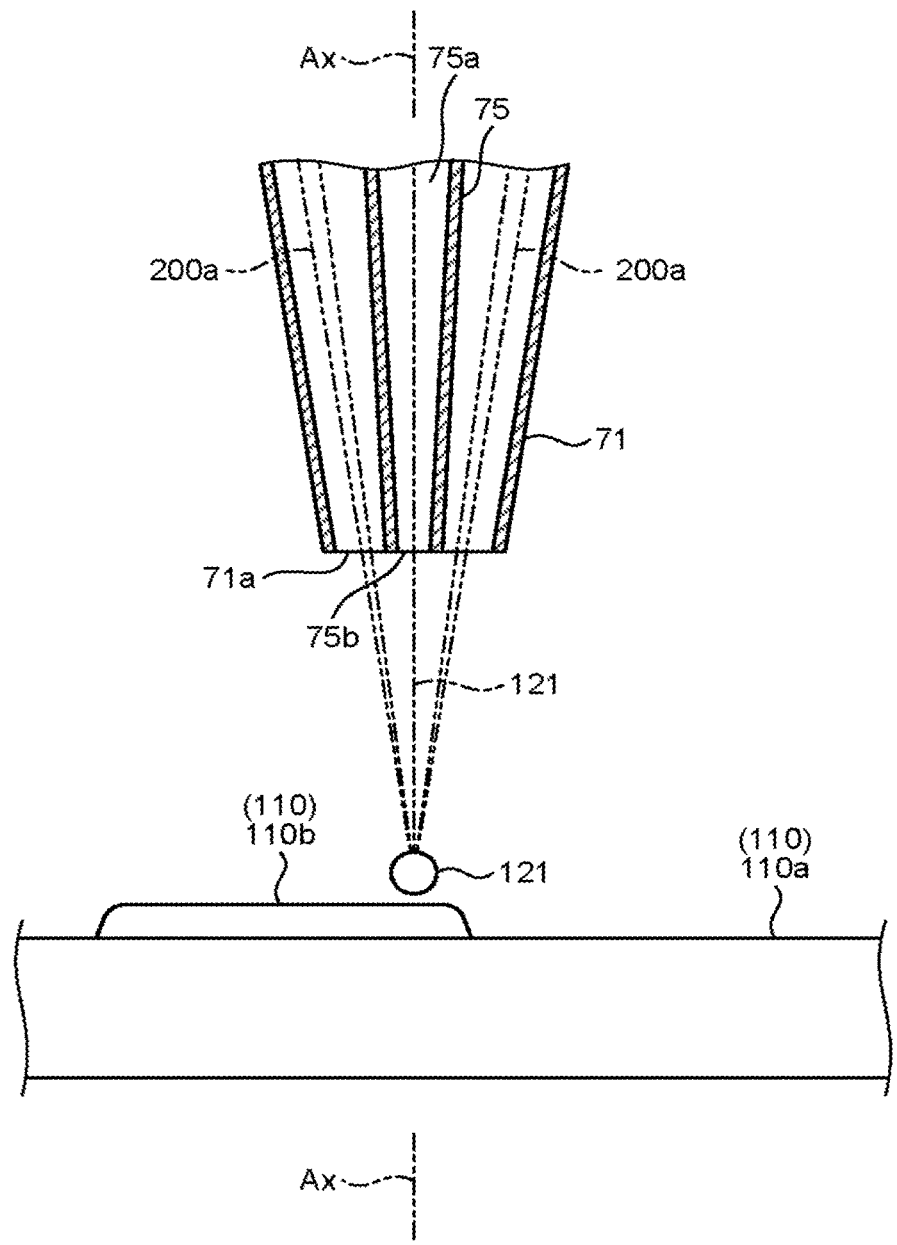
FIG. 7 is a schematic diagram illustrating a part of the one example of the additive layer manufacturing apparatus in the first embodiment.

As illustrated in FIG. 7, in the inside of the pipe 75, the pathway 75a is provided. Furthermore, at the lower end portion (distal end portion) of the pipe 75, an opening 75b that communicates with the pathway 75a is provided. The opening 75b is positioned above (the lens 74 side of) the light condensing region 200b of a plurality of laser beams 200a, and is opposite to the light condensing region 200b in the up-and-down direction. The opening 75b is positioned above the target object 110, and is opposite to the target object 110 in the up-and-down direction. The opening 75b is one example of a third opening.

The pipe 75 jets from the opening 75b the material 121 that is fed into the pathway 75a together with the carrier gas from the feeding pipe 34. Specifically, the pipe 75 (opening 75b) jets the material 121 to the target object 110 substantially perpendicularly from above the target object 110. The jetted-out material 121 reaches the light condensing region 200b of the laser beams 200a and is melted at the light condensing region 200b. The melted material 121 is fed onto the target object 110 and is stacked on the target object 110. In the case of a structure that jets out the carrier gas and the material 121 from obliquely above with respect to the target object 110, the material 121 rebounds from the target object 110 and scatters easily, and the diameter of the aggregation of the material 121 on the target object 110 is likely to increase. In contrast, in the first embodiment, the pipe 75 jets out the carrier gas and the material 121, from above the target object 110, substantially perpendicularly with respect to the target object 110. Thus, for example, even when the material 121 that reached the target object 110 rebounds from the target object 110, the material 121 rebounds in the direction perpendicular to the target object 110. Accordingly, the material 121 is pushed toward the target object 110 by the carrier gas jetted from above. Consequently, the material 121 tends to remain on the target object 110, and the scattering of the material 121 is likely to be suppressed. Furthermore, because the pipe 75 jets out the material 121, from above the target object 110, substantially perpendicularly with respect to the target object 110, the diameter of the aggregation of the material 121 on the target object 110 is likely to be reduced.

As in the foregoing, in the first embodiment, the nozzle 33 (light irradiation device) includes the mirror 73 (branching unit), the lens 74 (light condensing unit), and the pipe 75 (function unit). The mirror 73 causes the laser beam 200 (second light beam) to branch into a plurality of laser beams 200a (first light beams). The lens 74 condenses the laser beams 200a. The pipe 75, at least a part thereof, is positioned at a location (region) surrounded by the laser beams 200a. Consequently, according to the first embodiment, the pipe 75 can be arranged at a location that the pipe 75 can jet the carrier gas and the material 121 perpendicularly to the target object 110, a location that the pipe 75 overlaps with the central axis of the nozzle 33, and a location immediately above the light condensing region 200b, for example. In other words, according to the first embodiment, the degree of freedom in the layout of the pipe 75 can be improved, and the pipe 75 can be arranged at a location that it better functions, for example.

Furthermore, in the first embodiment, the mirror 73 includes the reflecting faces 73c and 73d. The reflecting face 73c, when viewing the pipe 75 with the first direction D as a line-of-sight direction, is positioned at a location overlapping with the pipe 75 and is positioned rearward of the pipe 75. The reflecting faces 73d, when viewing the pipe 75 with the first direction D as a line-of-sight direction, are positioned forward than the reflecting face 73c at locations deviating from the pipe 75. Consequently, according to the first embodiment, the reflecting faces 73c and 73d reflect the whole light beam of the laser beam 200. Thus, the laser beam 200 can be branched into a plurality of laser beams 200a around the pipe 75.

In the first embodiment, the mirror 73 includes a plurality of reflecting faces 73d. The reflecting face 73c, when viewing the pipe 75 with the first direction D as a line-of-sight direction, is positioned between the reflecting faces 73d. Consequently, according to the first embodiment, the laser beam 200 can be branched into three laser beams 200a that surround the pipe 75.

In the first embodiment, the lens 74 is provided with the opening 74a that accommodates a part of the pipe 75 at a location on the center side of the lens 74 among a plurality of laser beams 200a. Thus, according to the first embodiment, the pipe 75 can be positioned relatively close to the light condensing region 200b of the laser beams 200a. The material 121 fed from the pipe 75 spreads out wider at the target object 110 as the pipe 75 is farther away from the light condensing region 200b. Consequently, by bringing the pipe 75 close to the light condensing region 200b, the spreading of the fed material 121 at the target object 110 can be reduced. This enables molding with high accuracy.

Moreover, in the first embodiment, the lens 74 is provided with the opening 74a at a location deviating from the regions 74b through which a plurality of laser beams 200a pass. Consequently, according to the first embodiment, the laser beams 200a are favorably condensed by the lens 74.

Second Embodiment

Figure 9:
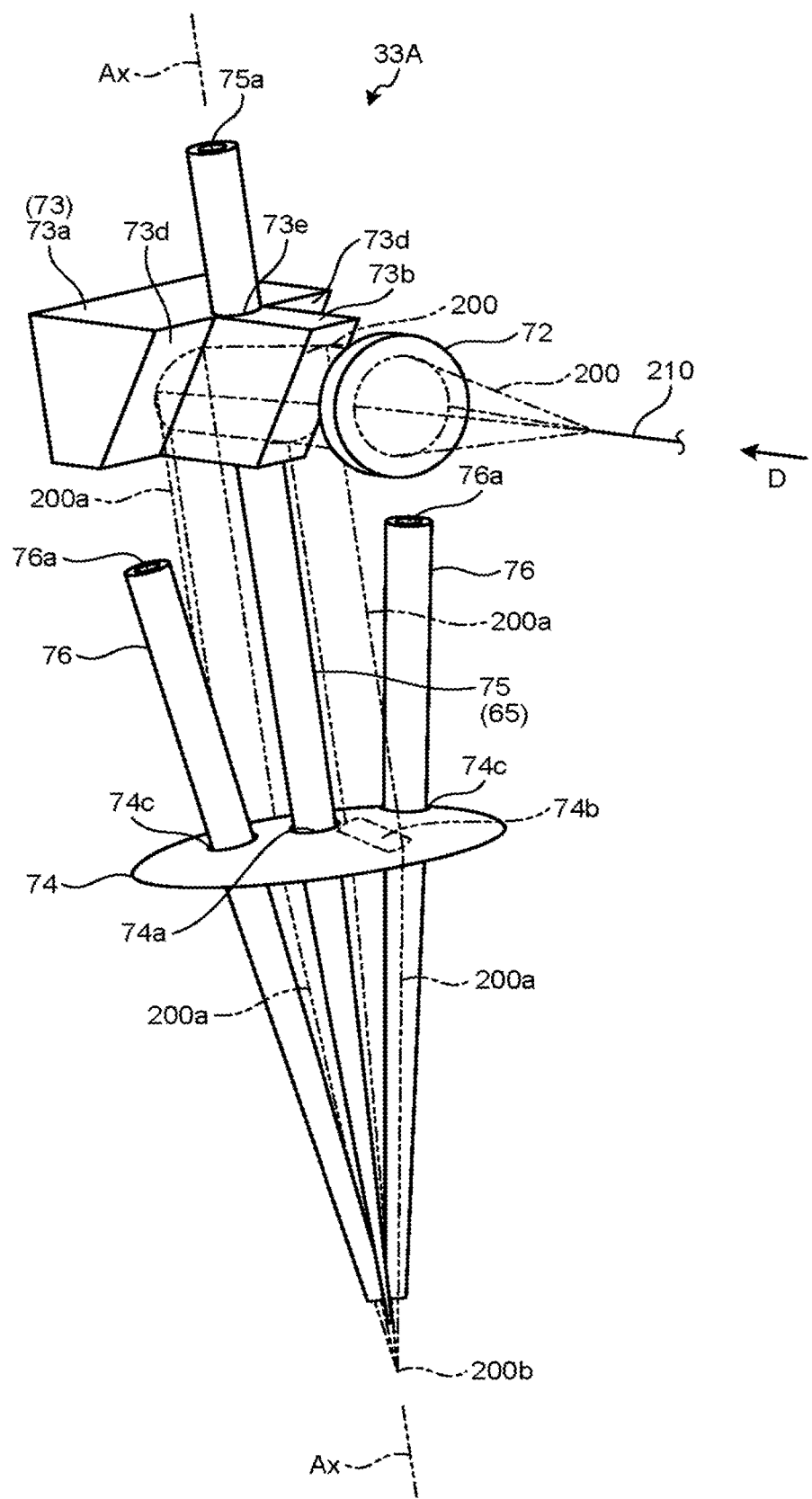
FIG. 9 is a perspective view illustrating a schematic configuration of the inside of one example of a light irradiation device according to a second embodiment.

In a second embodiment, a nozzle 33A is different from the first embodiment. As illustrated in FIG. 9, the nozzle 33A includes pipes 76, in addition to the lens 72, the mirror 73, the lens 74, and the pipe 75. The lens 74 also is different from that of the first embodiment.

Figure 10:
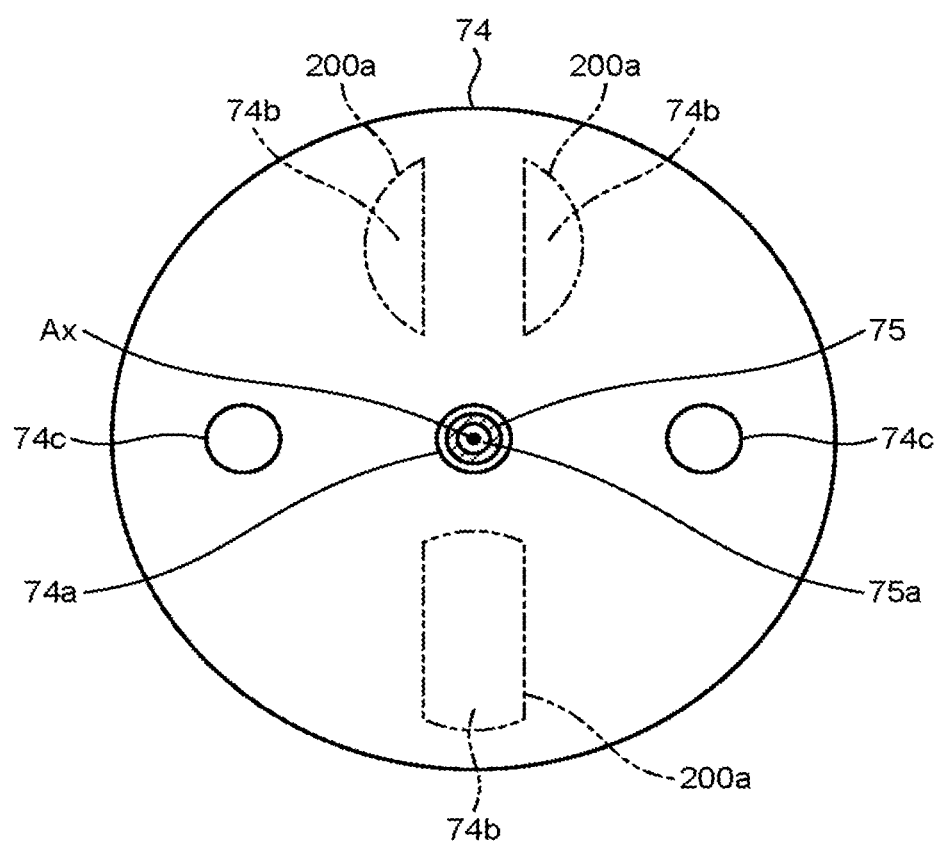
FIG. 10 is a front view of one example of a light condensing unit in the second embodiment.

As illustrated in FIG. 10, the lens 74 is provided with two (a plurality of) openings 74c, in addition to the opening 74a. The openings 74c are provided at locations of the lens 74 deviating from a plurality of regions 74b through which a plurality of laser beams 200a pass. The openings 74c are through-holes as one example. The openings 74c run through the lens 74 along the optical axis of the lens 74. The openings 74c may be cutouts.

The two (a plurality of) pipes 76 are positioned around the pipe 75. The pipes 76 are inclined with respect to the pipe 75 (the central axis Ax of the housing 71). In the inside of the pipe 76, a pathway 76a is provided. The pathway 76a communicates with the pathway 75a of the pipe 75 at the lower end portion. The pipes 76 are inserted into the openings 74c of the lens 74. That is, the opening 74c accommodates a part of the pipe 76. Into the pipes 76, the material 121 is fed from the feeding device 31 via the feeding pipes 34. In the second embodiment, the feeding pipe 34 is provided for each of the pipes 75 and 76, and the pipes 75 and 76 are connected to the feeding device 31 via the respective feeding pipes 34.

The material 121 fed to the respective pipes 75 and 76 may be of the same type or may be of different types from one another. In the latter case, when the materials 121 are fed to two or more of a plurality of pipes 75 and 76, those materials 121 are mixed at the lower end portion of the pipe 75. The mixed material 121 is jetted out from the opening 75b of the pipe 75. Meanwhile, when the material 121 is fed to only one of the pipes 75 and 76, the material 121 is jetted out from the opening 75b of the pipe 75. The pathway 75a and the pathway 76a of each pipe 75 and pipe 76 may be not connected to one another. In such a configuration, each of the pipes 75 and 76 may individually jet out the material 121, and the materials 121 that are jetted out from two or more of the pipes 75 and 76 may be mixed below the pipe 75. That is, a plurality of materials 121 may be mixed outside the pipes 75 and 76.

In the foregoing configuration, as the same as that in the first embodiment, at least a part of the pipe 75 (function unit) is positioned at a location surrounded by a plurality of laser beams 200a (first light beams). Consequently, even in the second embodiment, as the same as that in the first embodiment, the pipe 75 can be arranged such as at a location that the pipe 75 can jet the carrier gas and the material 121 perpendicularly to the target object 110, a location that the pipe 75 overlaps with the central axis of the nozzle 33A, and a location immediately above the light condensing region 200b. In other words, according to the second embodiment, the degree of freedom in the layout of the pipe 75 can be improved, and the pipe 75 can be arranged at a location that it better functions, for example. Furthermore, because the pipes 76 are provided, it is possible to mix different materials 121. Alternatively, by feeding the same material 121 to the respective pipes 75 and 76, it is also possible to increase the feeding amount of the material 121.

Third Embodiment

Figure 11:
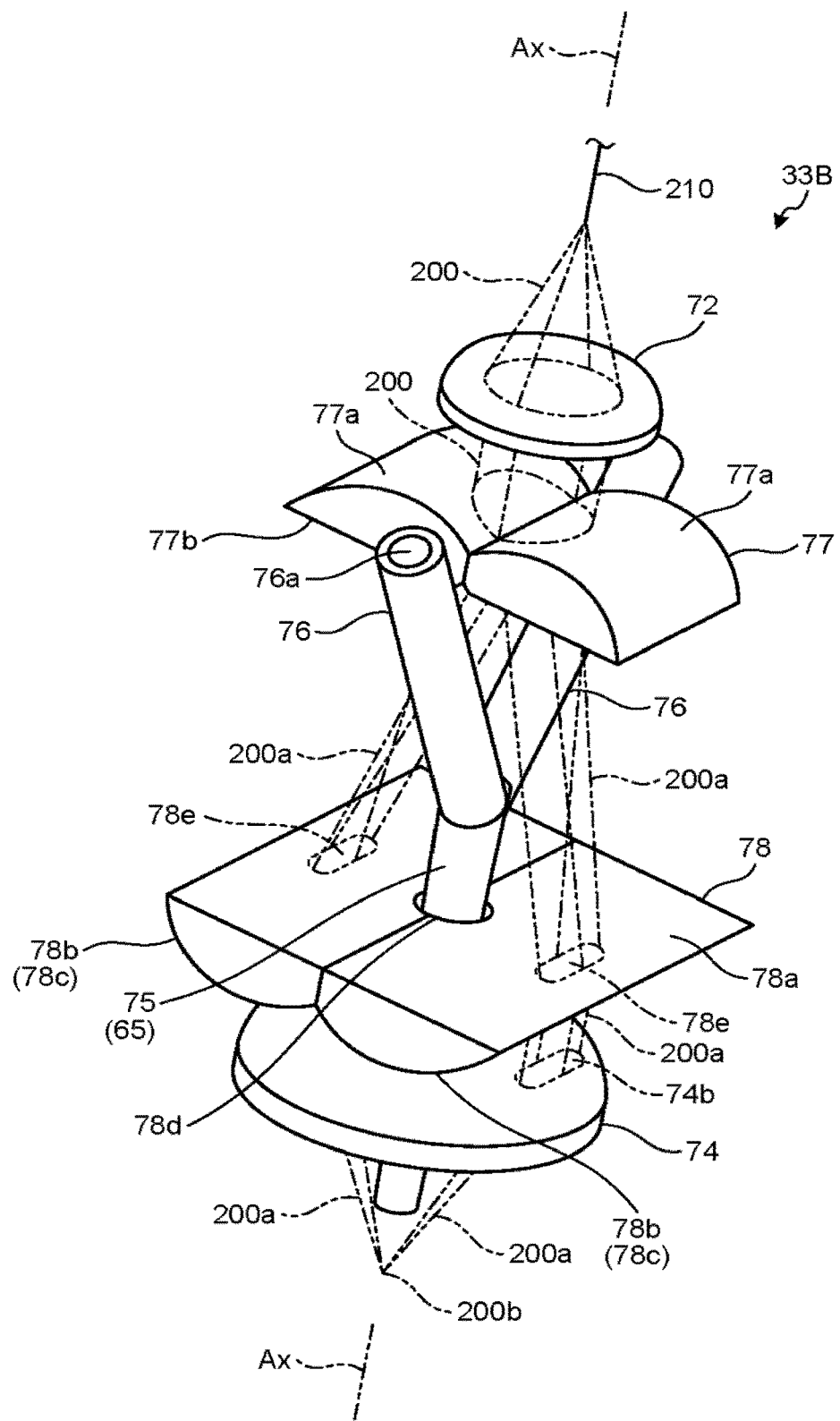
FIG. 11 is a perspective view illustrating a schematic configuration of the inside of one example of a light irradiation device according to a third embodiment.
Figure 12:
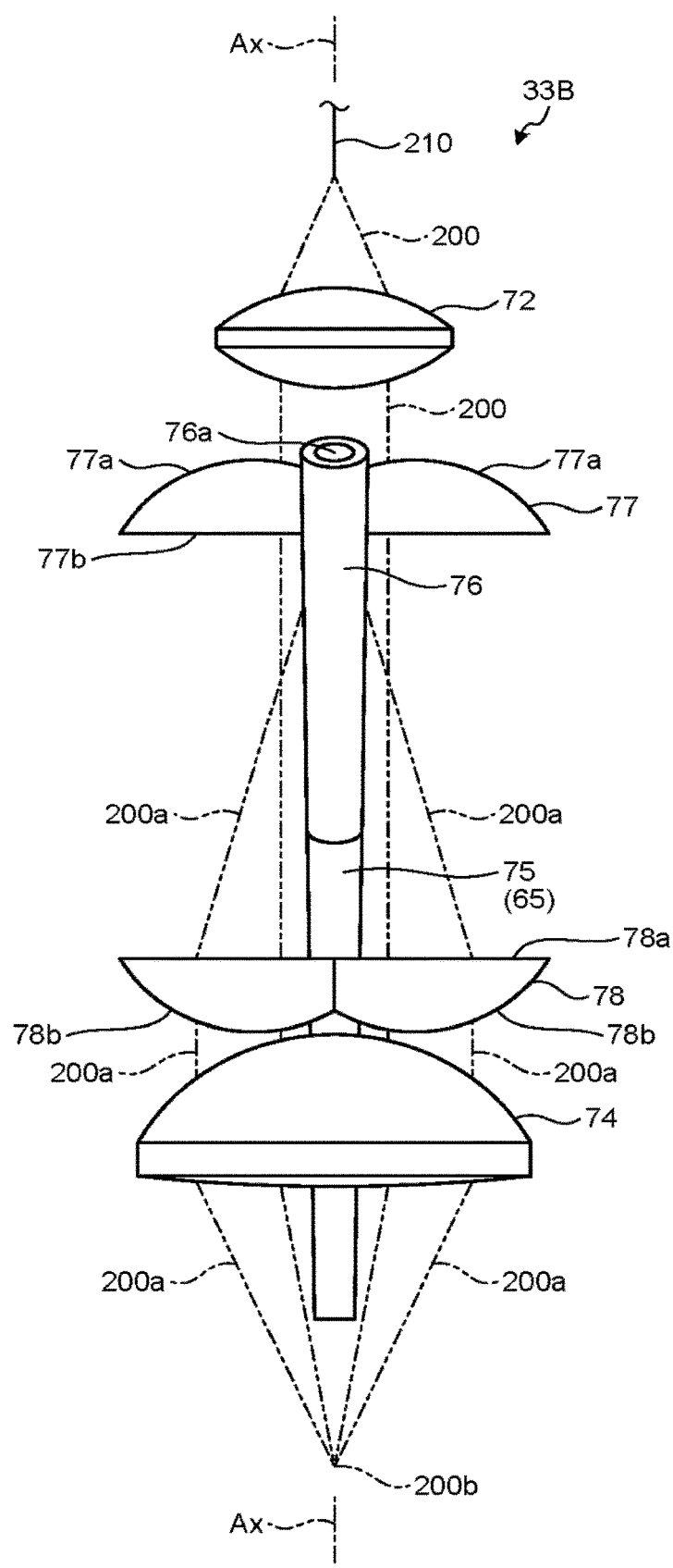
FIG. 12 is a side view illustrating the schematic configuration of the inside of the one example of the light irradiation device in the third embodiment.
Figure 13:
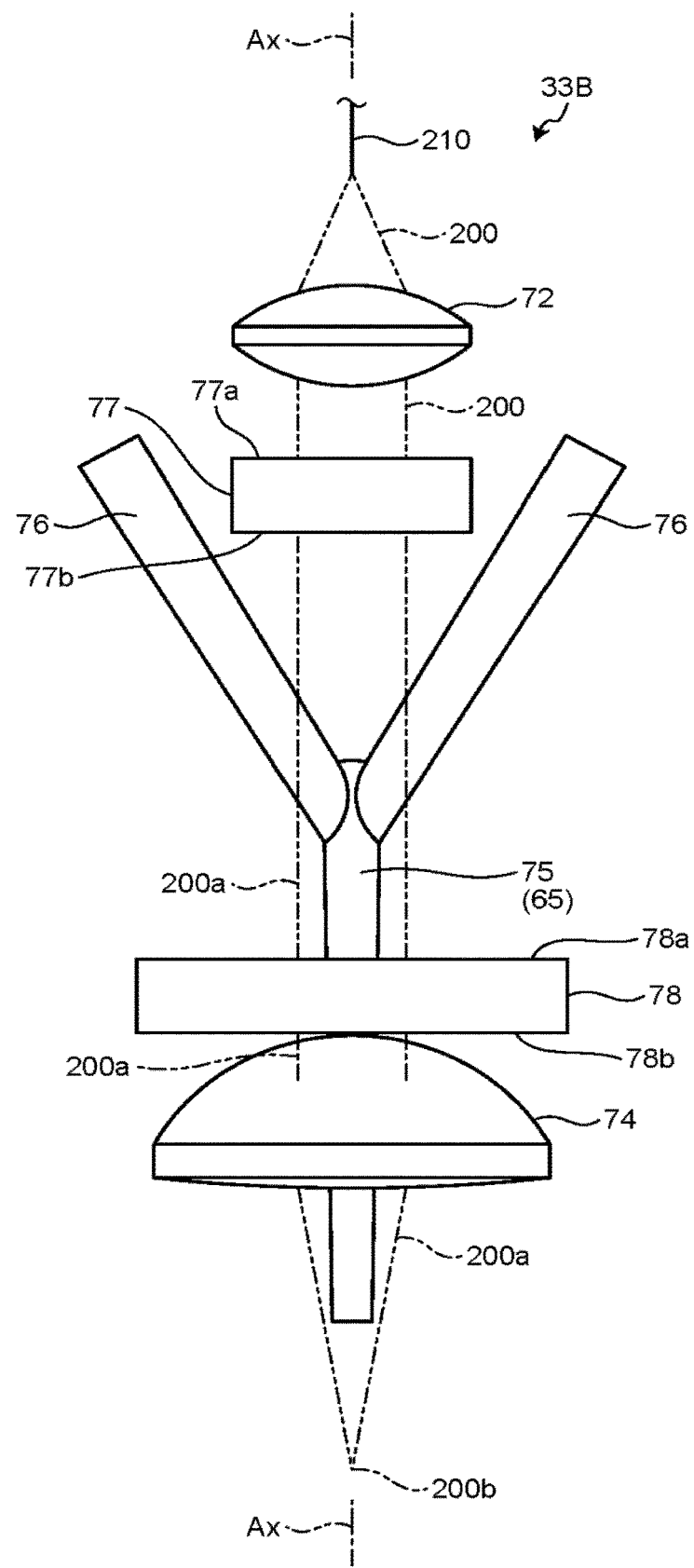
FIG. 13 is a side view illustrating the schematic configuration of the inside of the one example of the light irradiation device in the third embodiment and is the side view with a line of sight different from that of FIG. 12.

In a third embodiment, a nozzle 33B is different from the first embodiment. As illustrated in FIGS. 11 to 13, the nozzle 33B includes the lens 72, a lens 77, a lens 78, the lens 74, the pipe 75, and the pipes 76.

In the third embodiment, the lens 72 is positioned at an upper portion of the housing 71 in a position in which the optical axis thereof lies along the up-and-down direction (longitudinal direction) of the housing 71. The optical axis of the lens 72 substantially coincides with the central axis Ax of the housing 71. Into the lens 72, the laser beam 200 that has been emitted and diffused from the cable 210 enters. The lens 72 makes the incoming laser beam 200 into a parallel beam and emits it. The laser beam 200 emitted from the lens 72 is incident on the lens 77. The laser beam 200 that is incident on the lens 77 is one example of a second light beam.

Figure 14:
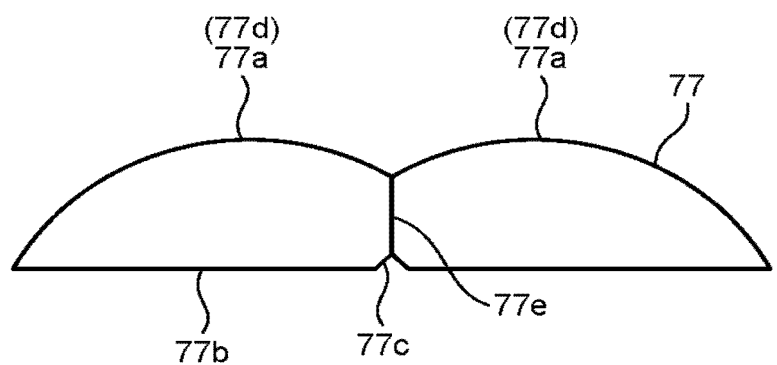
FIG. 14 is a side view of one example of a branching unit of the light irradiation device in the third embodiment.

The lens 77 is positioned below the lens 72, and is opposite to the lens 72 in the up-and-down direction of the housing 71. The lens 77 branches the incident laser beam 200 into a plurality of laser beams 200a. As illustrated in FIGS. 11 and 14, the lens 77 has two (a plurality of) incident faces 77a and a single emission face 77b. The incident face 77a is structured in a convex shape. Specifically, the incident face 77a is structured on a curved face composing a part of a cylindrical face. The incident face 77a projects toward the lens 72. The two incident faces 77a are connected to each other such that the axial centers of the cylinders are parallel to each other. The emission face 77b is structured substantially flat. In the lens 77, at a portion of the emission face 77b on the opposite side of a boundary portion of the two incident faces 77a, a recessed portion 77c is provided. The recessed portion 77c is recessed toward the boundary portion of the two incident faces 77a. The lens 77 is one example of a branching unit and a first lens.

The lens 77 can be structured by connecting two members 77d, for example. The member 77d is structured in a shape that a part of a cylindrical lens is removed. Each member 77d has a single incident face 77a and a part of the emission face 77b. At a boundary face 77e of the two members 77d, the recessed portion 77c is connected. The recessed portion 77c emits obliquely downward the laser beam 200 that has advanced the boundary face 77e to be included in the laser beam 200a. Accordingly, the laser beam 200 that has advanced the boundary face 77e is no longer wasted. That is, the improvement in usage efficiency of the laser beam 200 can be achieved. The lens 77 can be structured with the two members 77d of the same specifications.

As illustrated in FIG. 11, in the lens 77, the laser beam 200 enters the two incident faces 77a. The lens 77 makes the laser beam 200, which has entered the incident faces 77a, branch into two laser beams 200a and emits them from the emission face 77b. The laser beams 200a are converged between the lens 77 and the lens 78, are dispersed after the convergence, and enter the lens 78. In the third embodiment, because a single laser beam 200 is made to branch into a plurality of laser beams 200a with a single lens 77, those laser beams 200a are likely to enter the lens 78 simultaneously. That is, it has an advantage of performing aberration correction easily.

As illustrated in FIGS. 11 to 13, the lens 78 is positioned below the lens 77, and is opposite to the lens 77 in the up-and-down direction of the housing 71. The lens 78 is provided between the lens 77 and the lens 74. The lens 78 makes (converts) the incoming laser beams 200a into parallel beams and emits them.

The lens 78 has a single incident face 78a and two (a plurality of) emission faces 78b. The incident face 78a is structured substantially flat. The emission face 78b is structured in a convex shape. Specifically, the emission face 78b is structured on a curved face composing a part of a cylindrical face. The emission face 78b projects toward the lens 74. The two emission faces 78b are connected to each other such that the axial centers of the cylinders are parallel to each other. The lens 78 is one example of a second lens.

The lens 78 can be structured by connecting two members 78c, for example. Each member 78c has a part of the incident face 78a and a single emission face 78b. The member 78c is structured in a shape that a part of a cylindrical lens is removed. The lens 78 can be structured with the two members 78c of the same specifications.

In the lens 78, the two laser beams 200a enter the incident face 78a. The lens 78 makes (converts) the respective incoming laser beams 200a into parallel beams and emits them from the emission faces 78b. A single emission face 78b emits a single laser beam 200a.

Furthermore, on the lens 78, an opening 78d is provided. The opening 78d is provided at a location on the center side of the lens 78 between the two (a plurality of) laser beams 200a. Specifically, the opening 78d is provided at the central portion of the lens 78. The opening 78d is provided at a location of the lens 78 deviating from regions 78e through which the laser beams 200a pass. The opening 78d is a through-hole as one example. The opening 78d runs through the lens 78 along the optical axis of the lens 78. The opening 78d accommodates a part of the pipe 75. The opening 78d may be a cutout. The opening 78d is one example of a first opening.

Figure 15:
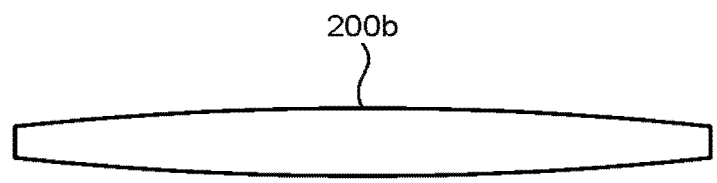
FIG. 15 is a schematic diagram of a light condensing region of laser beams that the one example of the light irradiation device in the third embodiment irradiated.

The structure of the lens 74 is the same as that of the first embodiment. However, in the third embodiment, the two laser beams 200a emitted from the lens 78 are incident on the lens 74. The lens 74 condenses the two incident laser beams 200a. A plurality of laser beams 200a are condensed while avoiding the pipe 75. The shape of the light condensing region 200b (light condensing spot) of the two laser beams 200a condensed by the lens 74, as illustrated in FIG. 15 as one example, is to be linear (belt-like) by the action of the lens 77. The light condensing region 200b extends along the axial centers of the cylinders of the lenses 77 and 78.

As illustrated in FIGS. 11 to 13, the pipe 75 extends along the up-and-down direction of the housing 71. In the pipe 75, its pathway 75a overlaps with the central axis Ax of the housing 71. The pipe 75 is inserted into the opening 78d of the lens 78 and into the opening 74a (see FIG. 6) of the lens 74. The pipe 75 extends downward from midway between the lens 77 and the lens 78. In the third embodiment, the pipe 75, at least a part thereof, is positioned at a location between the two (a plurality of) laser beams 200a. Specifically, in the third embodiment, a whole of the pipe 75, at least a part thereof, is positioned at a location between the two (a plurality of) laser beams 200a. That is, around the pipe 75, the two (a plurality of) laser beams 200a are arranged. The two (a plurality of) laser beams 200a are condensed while avoiding the pipe 75.

Two (a plurality of) pipes 76 are provided. The pipes 76 are connected to the upper end portion of the pipe 75. The pipes 76 are inclined with respect to the pipe 75 (the central axis Ax of the housing 71). The pipes 76 extend obliquely upward from the upper end portion of the pipe 75 in directions different from each other. The pipe 76 extends laterally with respect to the lens 77, from a location between the lens 77 and the lens 78. The lower end portions of the pathways 76a of the pipes 76 communicate with the upper end portion of the pathway 75a of the pipe 75. Into the pipes 76, the material 121 is fed from the feeding device 31 via the feeding pipes 34. In the third embodiment, the feeding pipe 34 is provided for each of the pipes 76, and the pipes 76 are connected to the feeding device 31 via the respective feeding pipes 34 corresponding thereto. In the third embodiment, the pipe 75 is not connected to the feeding pipe 34 directly.

The material 121 fed to the respective pipes 76 may be of the same type or may be of different types from each other. In the latter case, when the materials 121 are fed to the respective pipes 76, those materials 121 are mixed together in the pipe 75. The mixed material 121 is jetted out from the opening 75b of the pipe 75. Meanwhile, when the material 121 is fed to only one of the two pipes 76, the material 121 is jetted out from the opening 75b of the pipe 75.

In the foregoing configuration, at least a part of the pipe 75 (function unit) is positioned at a location among a plurality of laser beams 200a. Consequently, according to the third embodiment, as the same as that in the first embodiment, the pipe 75 can be arranged such as at a location that the pipe 75 can jet the carrier gas and the material 121 perpendicularly to the target object 110, a location that the pipe 75 overlaps with the central axis of the nozzle 33B, and a location immediately above the light condensing region 200b. In other words, according to the third embodiment, the degree of freedom in the layout of the pipe 75 can be improved, and the pipe 75 can be arranged at a location that it better functions, for example. Furthermore, because the pipes 76 are provided, it is possible to mix different materials 121. Alternatively, by feeding the same material 121 to the respective pipes 76, it is also possible to increase the feeding amount of the material 121.

Moreover, in the third embodiment, the branching unit is the lens 77. Consequently, according to the third embodiment, as compared with the case in which the branching unit is a mirror, energy absorption of the laser beam 200 by the branching of the laser beam 200 can be suppressed.

In the third embodiment, the lens 78 is provided between the lens 77 and the lens 74, and the lens 78 makes a plurality of incoming laser beams 200a into parallel beams and emits them. Consequently, according to the third embodiment, because the parallel beams are incident on the lens 74, the laser beams 200a can be condensed further easily or further accurately with the lens 74.

In the third embodiment, the lens 78 is provided with the opening 78d that accommodates a part of the pipe 75 at a location on the center side of the lens 78 among a plurality of laser beams 200a. Thus, according to the third embodiment, the pipe 75 can be positioned relatively close to the light condensing region 200b of the laser beams 200a. The material 121 fed from the pipe 75 spreads out wider at the target object 110 as the pipe 75 is farther away from the light condensing region 200b. Consequently, by bringing the pipe 75 close to the light condensing region 200b, the spreading of the fed material 121 at the target object 110 can be reduced. This enables molding with high accuracy.

Fourth Embodiment

Figure 16:
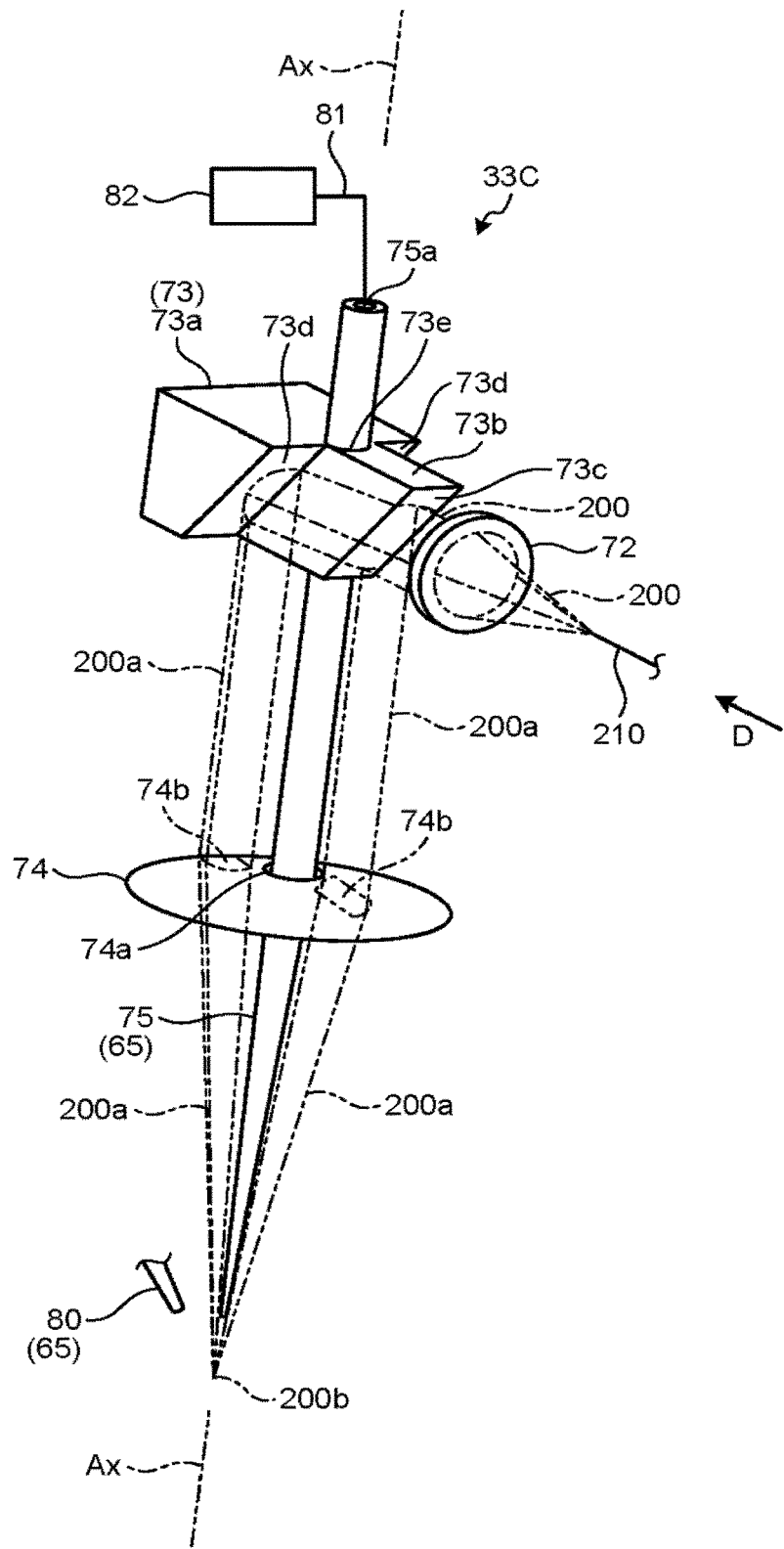
FIG. 16 is a perspective view illustrating a schematic configuration of the inside of one example of a light irradiation device according to a fourth embodiment.

In a fourth embodiment, a nozzle 33C is mainly different from the first embodiment. As illustrated in FIG. 16, the nozzle 33C includes a pipe 80, in addition to the lens 72, the mirror 73, the lens 74, and the pipe 75. In the fourth embodiment, the pipe 80 is for jetting of material, and the pipe 75 is for gas sucking.

The pipe 80 is connected to the feeding pipe 34. Into the pipe 80, the material 121 is fed from the feeding device 31 via the feeding pipe 34. The pipe 80 jets the material 121 toward the light condensing region 200b of the laser beams 200a. The pipe 90 composes, with the feeding device 31 and the feeding pipe 34, the material feeding unit 65.

The structure and arrangement of the pipe 75 are the same as those in the first embodiment, and on the pipe 75, the pathway 75a and the opening 75b (see FIG. 7) are provided. In the fourth embodiment, however, the pipe 75 is connected to a suction device 82 via a pipe 81. The suction device 82 includes a fan and a filter and sucks gas, for example. The pipe 75 sucks gas from the opening 75b by the suction operation of the suction device 82. The pipe 75 (opening 75b) sucks, by sucking gas around the light condensing region 200b of the laser beams 200a, soot and smoke that are caused due to the melting of the material 121 by the irradiation of the laser beams 200a. Because the soot and smoke rise, by locating the pipe 75 above the light condensing region 200b of the laser beams 200a, the pipe 75 can favorably suck the soot and smoke. In the fourth embodiment, the pipe 75 is one example of a function unit, and the opening 75b is one example of a fourth opening.

With the above-described configuration according to the fourth embodiment, as the same as that in the first embodiment, the pipe 75 can be arranged such as at a location that the pipe 75 overlaps with the central axis of the nozzle 33C, and a location immediately above the light condensing region 200b. In other words, according to the fourth embodiment, the degree of freedom in the layout of the pipe 75 can be improved, and the pipe 75 can be arranged at a location that it better functions, for example.

As in the foregoing, according to the above-described respective embodiments, the degree of freedom in the layout of the pipe 75 can be improved, and the pipe 75 can be arranged at a location that it better functions, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. For example, the function unit may be an image pickup device (camera), a temperature sensor, a lighting device, and others. Furthermore, the pipe 75 may jet out detergent. The function unit may be a component, a structure, a shape, and others that fixedly or detachably supports or holds a device, a component, an electrical component, a sensor, and others.

The branching unit may be configured to include a plurality of mirrors having respective reflecting faces. Moreover, the branching unit may be branch optical fibers in which the incident laser beam 200 is branched into a plurality of laser beams 200a with a plurality of branch lines and in which the laser beams 200a are emitted from the branch lines. In this case, for each branch line, a lens that makes the laser beam 200a into a parallel beam may be provided. Furthermore, not a diffusing light beam but a parallel beam may be incident on the light irradiation device. In this case, the lens 72 can be omitted.

The light condensing unit may be configured to include a plurality of lenses. Furthermore, the reflecting faces 73c and 73d of the mirror 73 may be formed as concave curved faces to condense a plurality of laser beams 200a with the reflecting faces 73c and 73d. In this case, because the mirror 73 functions as a branching unit and a light condensing unit, the lens 74 can be omitted.

Moreover, the additive layer manufacturing apparatus may be configured, by repeatedly performing a process of forming a material layer by feeding powdery material with the material feeding unit, and a process of irradiating the material layer with a light beam by the light irradiation device, to perform molding by stacking solidified layers, for example. In this case, in the light irradiation device, the structure for jetting the material is not needed.

The invention claimed is:

1. A light irradiation device for an additive layer manufacturing apparatus, the light irradiation device comprising:
   a light condensing unit that condenses a plurality of first light beams; and
   a function unit, at least a part of the function unit is positioned at a location among the plurality of first light beams or at a location surrounded by the plurality of first light beams, wherein
   the light condensing unit is a third lens, and
   a part of the function unit is positioned at a location on a center side of the third lens among the plurality of first light beams.

2. The light irradiation device according to claim 1, further comprising a branching unit that causes a second light beam to branch into the plurality of first light beams.

3. The light irradiation device according to claim 2, wherein the branching unit, when viewing the function unit in a first direction as a line-of-sight direction, includes a first reflecting face positioned rearward of the function unit at a location overlapping with the function unit and a second reflecting face positioned forward of the first reflecting face at a location deviating from the function unit, the first direction being a traveling direction of the second light beam toward the branching unit.

4. The light irradiation device according to claim 3, wherein
the second reflecting face includes a plurality of second reflecting faces,
the branching unit includes the plurality of second reflecting faces, and
the first reflecting face, when viewing the function unit with the first direction as a line-of-sight direction, is positioned among the plurality of second reflecting faces.

5. The light irradiation device according to claim 2, wherein the branching unit is a first lens including a plurality of convex incident faces that the second light beam enters and a single emission face that emits the plurality of first light beams.

6. The light irradiation device according to claim 5, further comprising a second lens that is provided between the first lens and the light condensing unit, makes the plurality of incoming first light beams into parallel beams, and emits the parallel beams.

7. The light irradiation device according to claim 6, wherein the second lens is provided with a first opening that accommodates a part of the function unit at a location on a center side of the second lens among the plurality of first light beams.

8. The light irradiation device according to claim 1, wherein the third lens is provided with a second opening that accommodates the part of the function unit at a location on a center side of the third lens among the plurality of first light beams.

9. The light irradiation device according to claim 8, wherein the third lens is provided with the second opening at a location deviating from a plurality of regions through which the plurality of first light beams pass.

10. The light irradiation device according to claim 1, wherein the function unit is provided with a third opening that jets out material.

11. The light irradiation device according to claim 1, wherein the function unit is provided with a fourth opening that sucks gas.

12. An additive layer manufacturing apparatus, comprising:
the light irradiation device according to claim 1;
a light source; and
a material feeding unit.

13. A light irradiation device for an additive layer manufacturing apparatus, the light irradiation device comprising:
a light condensing unit that condenses a plurality of first light beams;
a function unit, at least a part of the function unit is positioned at a location among the plurality of first light beams or at a location surrounded by the plurality of first light beams; and
a branching unit that causes a second light beam to branch into the plurality of first light beams, wherein
the branching unit, when viewing the function unit in a first direction as a line-of-sight direction, includes a first reflecting face positioned rearward of the function unit at a location overlapping with the function unit and a second reflecting face positioned forward of the first reflecting face at a location deviating from the function unit, the first direction being a traveling direction of the second light beam toward the branching unit.

14. A light irradiation device for an additive layer manufacturing apparatus, the light irradiation device comprising:
a light condensing unit that condenses a plurality of first light beams;
a function unit, at least a part of the function unit is positioned at a location among the plurality of first light beams or at a location surrounded by the plurality of first light beams; and
a branching unit that causes a second light beam to branch into the plurality of first light beams, wherein
the branching unit is a first lens including a plurality of convex incident faces that the second light beam enters and a single emission face that emits the plurality of first light beams,
the light irradiation device further comprising a second lens that is provided between the first lens and the light condensing unit, makes the incoming first light beams into parallel beams, and emits the parallel beams, and
the second lens is provided with a first opening that accommodates a part of the function unit at a location on a center side of the second lens among the plurality of first light beams.

* * * * *